(12) United States Patent
Hsieh et al.

(10) Patent No.: US 7,356,141 B2
(45) Date of Patent: Apr. 8, 2008

(54) BAUD RATE MODULATION ENCODING/DECODING METHOD AND DEVICE FOR REMOTE CONTROLLER

(75) Inventors: Ian Hsieh, Hsinchu (TW); Jason Tsai, Hsinchu (TW)

(73) Assignee: Holtek Semiconductor Inc., Hsinchu (TW)

( * ) Notice: Subject to any disclaimer, the term of this patent is extended or adjusted under 35 U.S.C. 154(b) by 935 days.

(21) Appl. No.: 10/609,659

(22) Filed: Jul. 1, 2003

(65) Prior Publication Data

US 2005/0002524 A1 Jan. 6, 2005

(51) Int. Cl.
| | |
|---|---|
| H04K 1/10 | (2006.01) |
| H04N 7/167 | (2006.01) |
| G08C 19/00 | (2006.01) |
| B60R 25/10 | (2006.01) |
| G08C 19/12 | (2006.01) |
| H04L 17/02 | (2006.01) |
| H04L 9/00 | (2006.01) |
| H04K 1/00 | (2006.01) |

(52) U.S. Cl. .............. 380/31; 348/14.05; 340/426.13; 340/815.6; 340/825.69; 340/5.23; 367/197; 367/199; 398/106; 381/315; 341/176; 341/177; 341/178; 341/181; 341/182; 341/183; 380/34

(58) Field of Classification Search .......... 380/31, 380/34, 239, 32; 348/14.05; 340/426.13, 340/815.6, 825.69, 5.23; 367/197, 199; 398/106; 381/315; 341/176, 177, 178, 181, 182, 183; 713/182; 307/10.2; 70/256

See application file for complete search history.

(56) References Cited

U.S. PATENT DOCUMENTS 3,775,751 A * 11/1973 Anderson ................ 370/465
5,933,090 A * 8/1999 Christenson ......... 340/825.69
2002/0175827 A1* 11/2002 Klein et al. ........... 340/825.19

OTHER PUBLICATIONS

Microchip Technology, Inc. "KeeLoq Code Hopping Encoder", 2002.*

* cited by examiner

Primary Examiner—Kambiz Zand
Assistant Examiner—Michael J Simitoski
(74) Attorney, Agent, or Firm—Troxell Law Office, PLLC

(57) ABSTRACT

A encoding/decoding method and device for a remote controller utilizing a baud rate to encrypt data for transmission. The encoding device includes an encoder encoding an identification code into an encrypted code; and an interpreter interpreting the un-encoded portion of the identification code and the encrypted code into a transmission signal. When the encrypted code is in a first base, the plain code corresponding to the encrypted code will be transmitted with a first baud rate; and when the encrypted code is in a second base, the plain code corresponding to the encrypted code will be transmitted with a second baud rate. The decoding device includes a receiver receiving the transmission signal; a interpreter connected to the receiver interpreting the transmission signal into a received signal; an encoder utilizing the same encoding algorithm as in the transmitter to generate a comparison code; and a processor comparing the received signal and the comparison code.

13 Claims, 6 Drawing Sheets

BAUD RATE MODULATION ENCODING/DECODING METHOD AND DEVICE FOR REMOTE CONTROLLER

BACKGROUND OF THE INVENTION

1. Field of the Invention

The present invention generally relates to a wireless signal transmission encoding/decoding method and device, more particularly, to an encoding/decoding method and device utilizing a baud rate to encrypt data for transmission.

2. Description of the Prior Art

A remote controller is frequently used in daily life. Its application can be found in many fields such as car security, house security, audio/video equipment, and other appliances. In such applications, the remote controller is used for convenience. Although in many applications, security is not a major concern, it is a critical issue in other applications such as in a car security system, home security, and TV channel protection.

In general, the remote controller system can be classified into two categories: one-direction and bi-direction. In a one-direction remote controller system, a transmitter simply transmits a control signal to control equipment in a remote location. While in a bi-direction remote controller system, a control signal is transmitted interactively between a transmitter and a receiver. The bi-direction remote controller system is much more reliable for it employs the function of mutual authentication. However, since it is complex and expensive, it is seldom used except in some certain cases.

In a simplest remote controller system, the control signal is formatted in plaintext and transmitted wirelessly to the receiver. Since the control signal is transmitted in plaintext, it is so easy to be eavesdropped and modified by a hacker, so the system is extremely unsecured. A common example seen in daily life is when someone uses a remote controller to open his own garage door, he opens his neighborhood's garage door at the same time.

As technology for security advances, there will be more and more remote controllers transmitting signals in encrypted format, which means, when a remote controller is transmitting signals, the signal is separated into plain code and encrypted code. The plain code is in regular format, comprising a fixed data structure, while the encrypted code, in transmission, is encrypted with certain mathematical algorithm and is difficult to be decoded by a hacker. The concept of encrypting a signal for security is not difficult to understand, however, the practical implementation is quite complex, and the cost is relatively high. The present invention discloses a signal transmitting method and device wherein a plain code and an encrypted code will be encapsulated in one single signal. An application can be seen where the plain code is used in a public entrance security system such as a community gateway or a public garage door that only needs the plain code for identification, while in a different application such as a private garage door security system, the plain code and the encrypted code will be verified at the same time for strict authentication.

SUMMARY OF THE INVENTION

Accordingly, it is the primary object of the present invention to provide a wireless signal transmission encoding/decoding method and device, more particularly, a encoding/decoding method and device that utilizes a logical algorithm to encrypt a signal for transmission.

It is the second object of the present invention to provide the encoding/decoding method and device that is simple and less expensive.

The method of the present invention is to employ a baud rate modulation to encrypt transmission data and encapsulate the transmission data in a transmission signal for transmission, comprising the steps as follows:

(a) utilizing an identification signal to generate a plain code and a encrypted code;

(b) utilizing the encrypted code to control the baud rate for transmitting the plain code; when the encrypted code is in a first base, the plain code corresponding to the encrypted code will be transmitted with a first baud rate; when the encrypted code is in a second base, the plain code corresponding to the encrypted code will be transmitted with a second baud rate.

The device of the present invention is to employ baud rate modulation to encrypt transmission data, comprising:

an encoder for receiving an identification code and encoding a portion of the identification code into an encrypted code;

an interpreter being connected to the encoder for combining the un-encoded portion of the identification code and the encrypted code into a transmission signal;

wherein, in the encoding process, the encoder will encode a length of the waveform of the un-encoded portion of the identification code according to the following rules, (1) when the encrypted code is in a first base, the plain code corresponding to the encrypted code will be transmitted with a first baud rate;

(2) when the encrypted code is in a second base, the plain code corresponding to the encrypted code will be transmitted with a second baud rate.

The decoding device of the remote controller of the present invention comprises:

a receiver for receiving a transmission signal;

an interpreter being connected to the receiver for utilizing a given baud rate to interpret the transmission signal into a received signal;

an encoder utilizing a logical algorithm to generate a comparison code; and a processor being connected to the interpreter and the encoder for comparing the received signal and the comparison code to determine if receive the instruction carrying on the transmission signal and controlling the process.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

DETAILED DESCRIPTION OF THE INVENTION

The present invention relates to a wireless signal transmission encoding/decoding method and device utilizing a logical algorithm to encrypt data for transmission is described in the following preferred embodiment.

Figure 1:
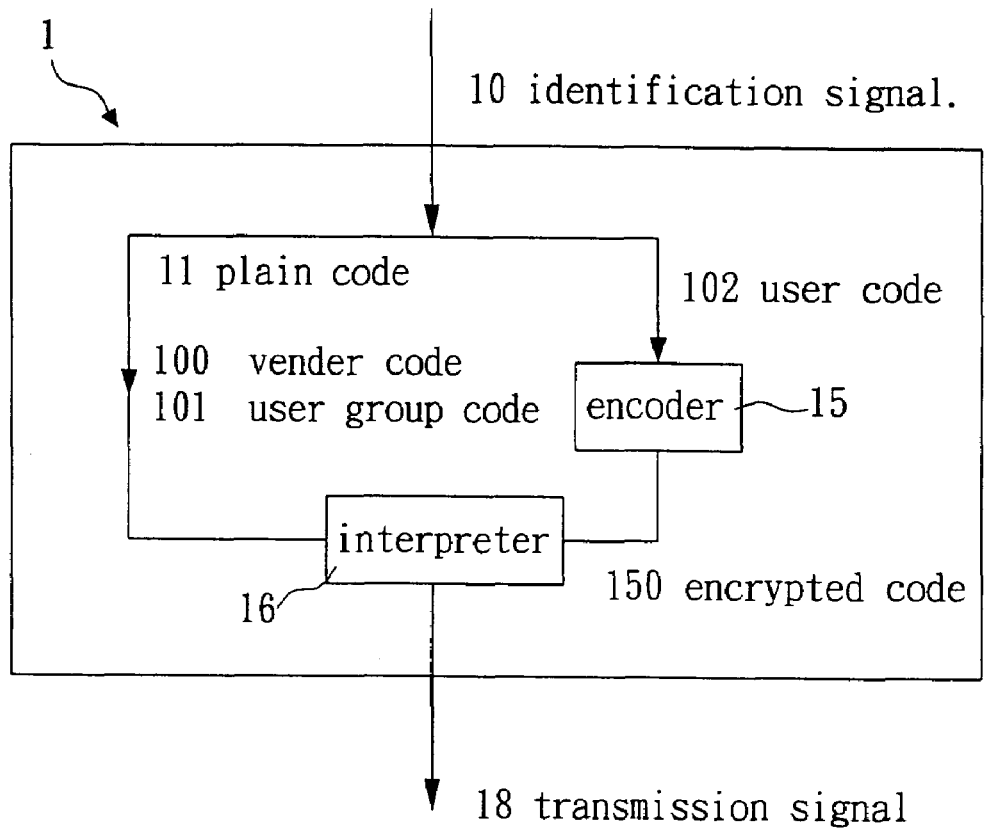
FIG. 1 is a schematic block diagram showing a transmitter according to the present invention.
Figure 2:
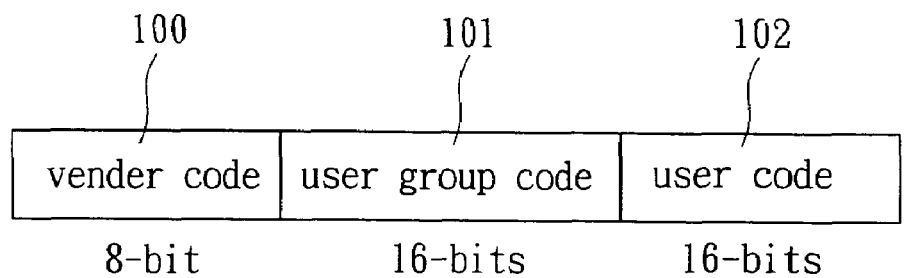
FIG. 2 is a schematic block diagram showing an identification signal according to the present invention.

FIG. 1 illustrates which is a schematic block diagram showing a transmitter according to the present invention. As shown, an identification signal 10 is input into an encoder 15 and an interpreter 16 in sequence. FIG. 2 illustrates an identification signal according to the present invention. As shown in FIG. 2, the identification signal 10 contains three sections. The first one is a vender code 100, which is an 8-bits code and represents the vender business identification code. The second one is a user group code 101, which is a 16-bits code and is designated for the user having a same property, such as working in the same company, same department or living in the same residential area. The third section is a user code 102, which is a 16-bits code and is used for a single user uniquely. In the embodiment of the present invention, the vender code 100 and the user group code 101 consist of a plain code 11, and the user code 102 is encoded and hidden in the plain code 11. The user code 102 in the identification signal is retrieved from the encoder 15 and encoded to be an encrypted code 150, and then transmitted to the interpreter 16. The interpreter 16 compiles the vender code 100 and the user code 102 in the identification signal 10 into plain code and converts the encrypted code 150 with baud rate modulation, and then compiles these three codes into a transmission signal 18. The present invention provides two layers of protection, that is, the signal is first interpreted by the interpreter 15 and then modulated with baud rate, whereby the protection for the identification signal is therefore enhanced.

Figure 3:
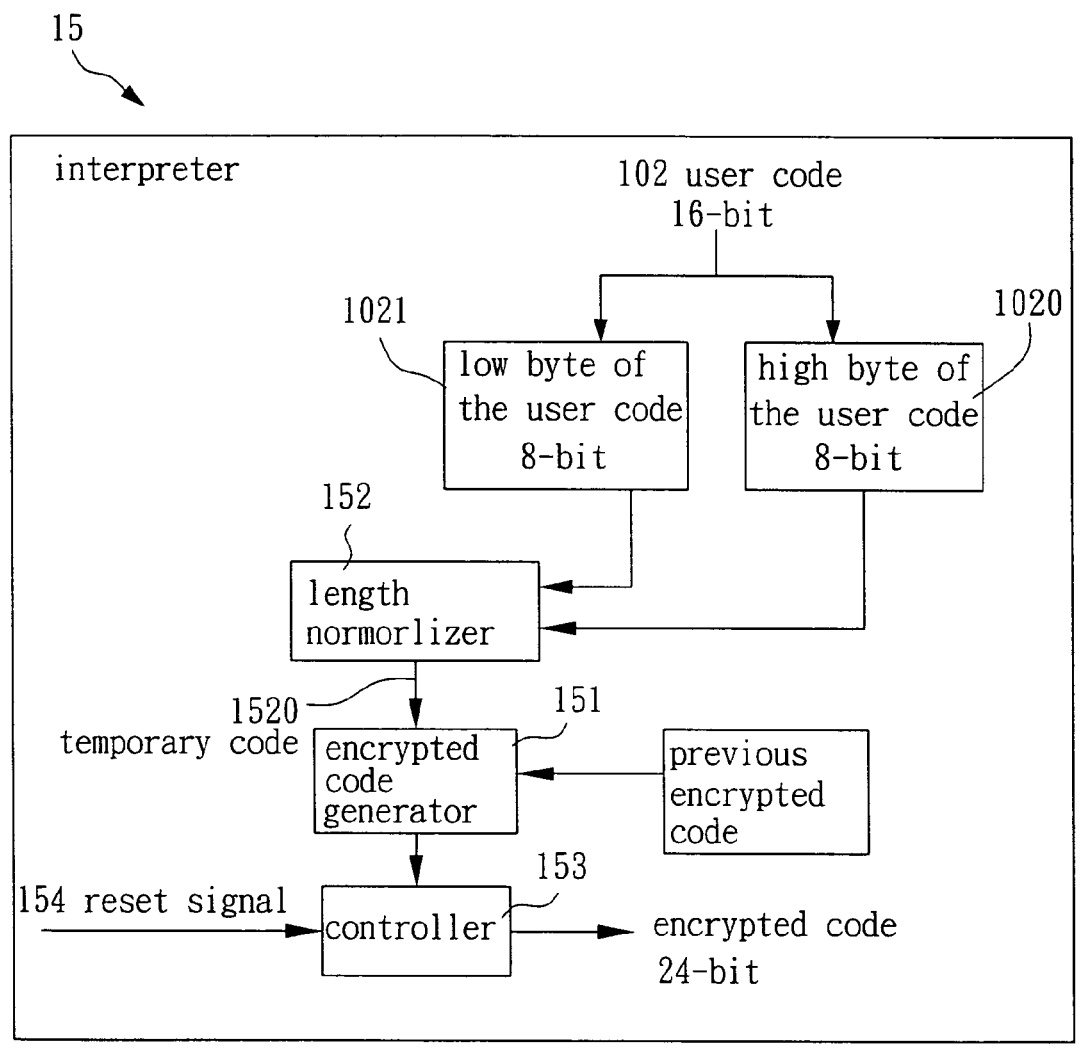
FIG. 3 is a flow chart showing the encoding process according to the present invention.

FIG. 3 is a flow chart showing the encoding process according to the present invention. The user code 102 in the interpreter 15 is used for generating an encrypted code 150 that is generated by an encrypted code generator 151. The encrypted code generator 151 not only re-encodes the user code 102 with mathematical algorithm but also normalizes the length of the encrypted code 150. After being normalized, the length of the encrypted code 150 is same as that of the plain code 11. The normalization can be performed before or after the encoding process, or even during the process. In the present embodiment, the length of the plain code 11 is consistent of the 8-bits vender code 100 and 16-bits user group code 101, that is, the total length of the plain code 11 is 24 bits. However, the length of the user code 102 is 16-bits so that it has to be adjusted to 24-bits to match the length of the plain code to meet the requirement for the interpreter 16. In the embodiment of the present invention, the normalization is completed before the process is performed by the encrypted code generator 151. Each length of the high byte 1020 and the low byte 1021 of the user code 102 is 8 bits, and a 24-bits temporary code 1520 is obtained after normalization. There are many ways to achieve the normalization. In the present invention, the Exclusive OR (XOR) operation applied on the high byte 1020 and the low byte 1021 of the user code is employed to obtain three bytes, the first byte to the third byte, and said three bytes are further consolidated to be the temporary code 1520.

Following the process of obtaining the temporary code 1520, as shown, is the process for generating the encrypted code 150. They are many techniques, such as a multinomial method or the famous one as RSA, can be used to provide the encryption function in the encrypted code generator 151. In the present invention, the Exclusive OR (XOR) operation 1520 is adapted to apply on the previous encrypted code 150 to obtain a new encrypted code. The Exclusive OR (XOR) operation is less complex and has a low cost, and a single solution can be used for both encoding and decoding. When using the encrypting process for the first time, how can the "previous" encrypted code be obtained to generate a new encrypted code? A pre-determined value is the solution of the problem. A pre-determined value can be treated as the "previous" encrypted code for generating a new encrypted code. The major reason for using the previous encrypted code to generate a new encrypted code is to prevent the "replay attack" submitted by a hacker. The function of the controller 153 is to convert the reset signal 154 into an encrypted code 150 and transmit it to the interpreter 16 or directly transmit the encrypted code 150 that is generated by the encrypted code generator 151 to the interpreter 16. The reset signal 154 can be set up in advance, and in this embodiment, the reset signal is defined as EF-FF-FEH.

Referring back to FIG. 1, the interpreter receives the encrypted code 150 generated by the encoder 15 and converts it with the plain code 11 in the identification signal 10 into the transmission signal 18. The rules for generating the transmission signal 18 include: first, the height of the waveform of the plain code 11 is kept unchanged, second, the length thereof is changed according to the following rules:

(1) when the encrypted code 150 is in a first base, the plain code corresponding to the encrypted code 150 is transmitted with a first baud rate; and (2) when the encrypted code 150 is in a second base, the plain code corresponding to the encrypted code 150 is transmitted with a second baud rate.

Figure 4A:
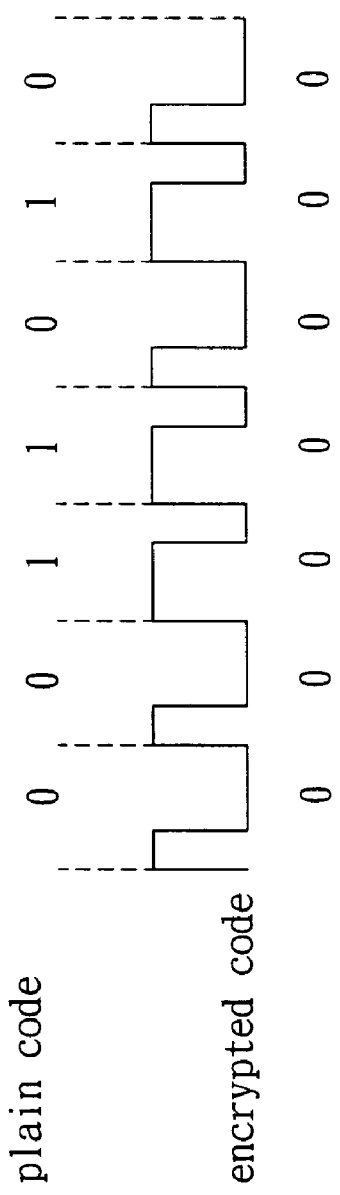
FIGS. 4A & 4B are diagrams showing the complied signal according to the present invention.
Figure 4B:
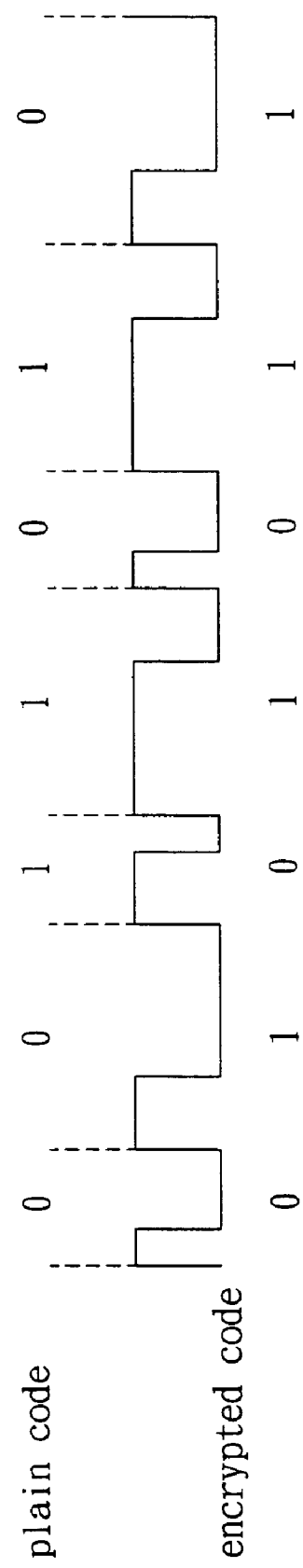

For example, when the encrypted code 150 is 0, the baud rate for transmitting the plain code 11 is unchanged; when the encrypted code 150 is 1, the baud rate will be reduced to half and the length of waveform is extended to two times long. FIGS. 4A and 4B are diagrams showing the complied signal according to the present invention. In the present embodiment, 3 bits are used to represent 0 or 1, that is, it represents 0 when these 3 bits are in 100, and 1 when 110. This will reduce the identification error occurred in the receiver 7, and only one time voltage change will occur in each bit, which make it easier for the receiver 7 to measure the length of bits. The present embodiment also illustrates that the baud rate is not changed when the encrypted code 150 is 0, which means there is no operation executed in the interpreter 16, and that baud rate of the plain code 11 will be reduced to half; meaning the length of the waveform is extended to two times long, by the interpreter 16 when the encrypted code 150 is 1. In FIG. 4A, the waveform is shown when the plain code 11 is in the format of 0011010, it is also the same waveform when the encrypted code 150 is in the format of 000000. As seen in FIG. 4A, the waveform of the 2, 4, 6 and 7 bit of the plain code 11 need to be extended to twice as long when the encrypted code 150 is in the format of 0101011.

Figure 5:
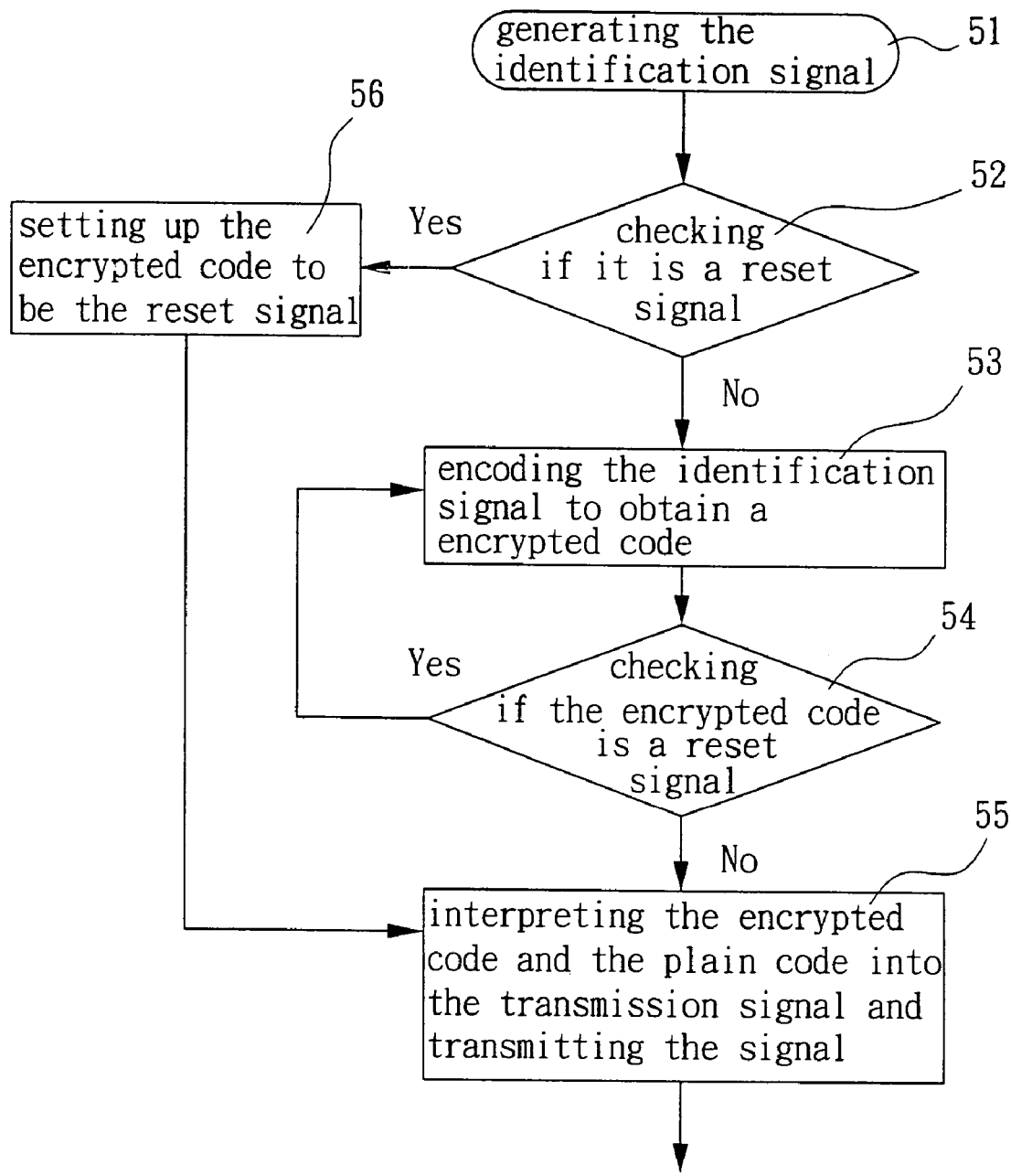
FIG. 5 is a flow chart showing the encoding process in a transmitter according to the present invention.

FIG. 5 is a flow chart showing the encoding process in a transmitter 1 according to the present invention. As seen, it comprises the following steps:

Step 51. generating the identification signal 10;

Step 52. checking if it is a reset signal 154, executing step 56 when yes, executing step 53 when no;

Step 53. executing the encoding process on the identification signal 10 to obtain an encrypted code 150;

Step 54. checking if the encrypted code 150 is equal to the pre-determined value that is representing the reset signal 154, executing step 5 when yes, executing step 55 when no;

Step 55. combining the encrypted code 150 and the plain code 11, complying them into the transmission signal 18 and transmitting the signal; and Step 56. setting up the encrypted code 150 to be the pre-determined value that is representing the reset signal 154 and executing the step 55.

Figure 6:
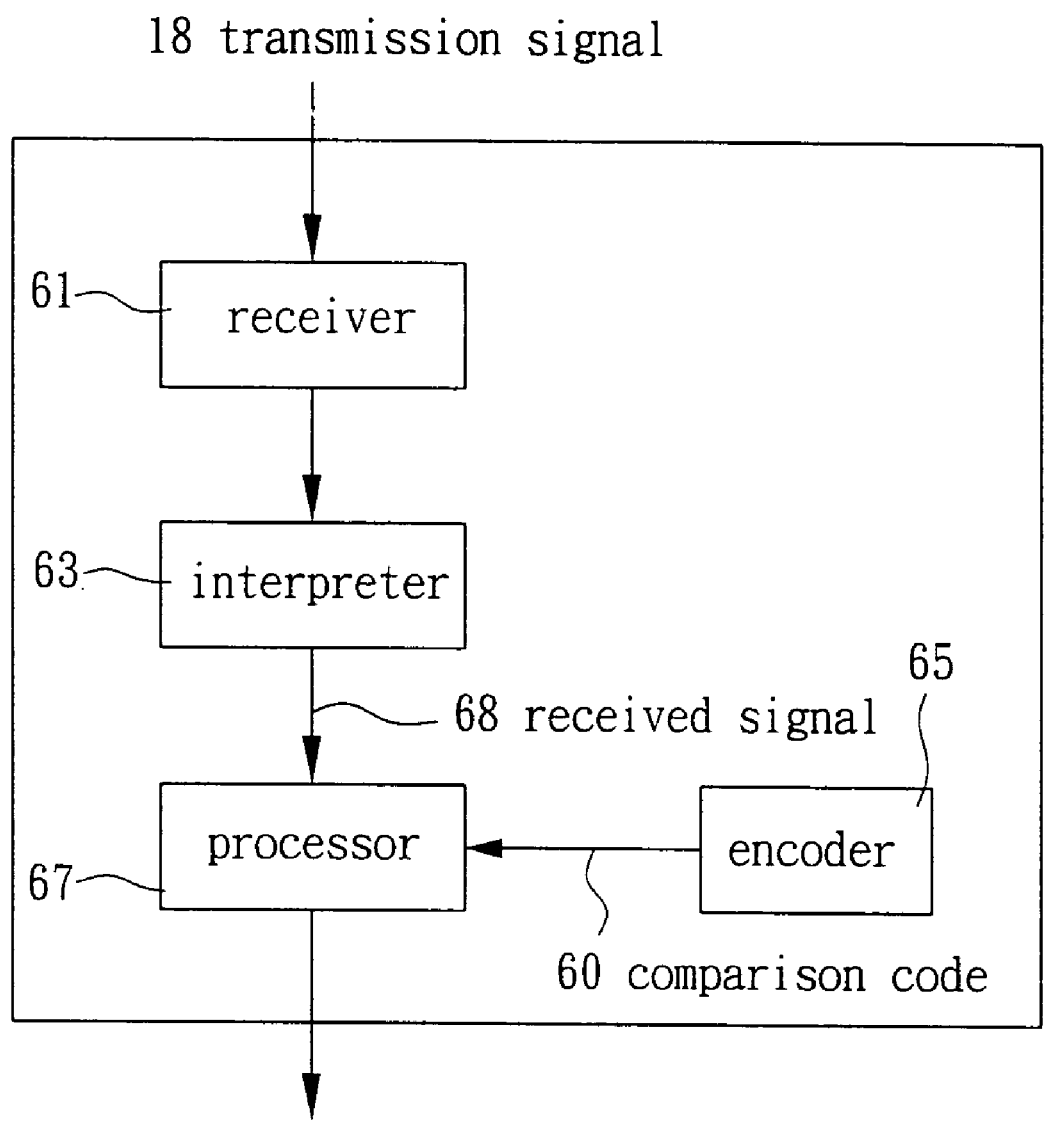
FIG. 6 is a schematic block diagram showing a receiver according to the present invention.

FIG. 6 is a schematic block diagram showing a receiver according to the present invention. As shown, the receiver end 6 receives the transmission signal 18 and converts it back to identification signal 10 for user identification and executing instructions. As seen, the receiver end 6 comprises a receiver 61, an interpreter 63, an encoder 65 and a processor 67. The receiver 61 is for receiving the transmission signal 18. The interpreter 63 is connected to the receiver 61 and will interpret the transmission signal to a received signal 68. The encoder 65 employs the same rules as in the encoder 15 of the transmitter 1 to generate a comparison code 60. The processor 67 is connected to the interpreter 63 and the encoder 65, and will compare the received signal 68 generated by the interpreter 63 with the comparison code 60 generated by the encoder 65. The process will be executed when the received signal 68 totally matches the comparison code 60. If they do not match, it could be a situation where a hacker is trying to start a attack, or a situation where a legal user hits the emitting switch by mistake to cause the encrypted code 150 in the transmitter end 1 to execute the process, so, in that case, even a legal user will not be able to start the process. In order to solve the above problem, an error allowance number 66 can be set up in advance. So, when the match is not correct, the receiver end 6 will automatically move to next comparison code 60 and compare it again with the received signal 68. If matched, the process will continue, if not, the process will move again to the next comparison code 60 and do the comparison until the number equal to the error allowance number 66. Here comes a problem, if the legal user makes the mistake too many times, or the receiver end 6 is under the attack from a hacker, the comparison code will exceed the legal user's encrypted code 150. The solution is to use the reset signal 154 to bring the encrypted code 150 in the transmitter end 1 and the comparison code 60 in the receiver end 6 back to their initial stage, so both of them can be synchronized and the process will function normally.

Figure 7:
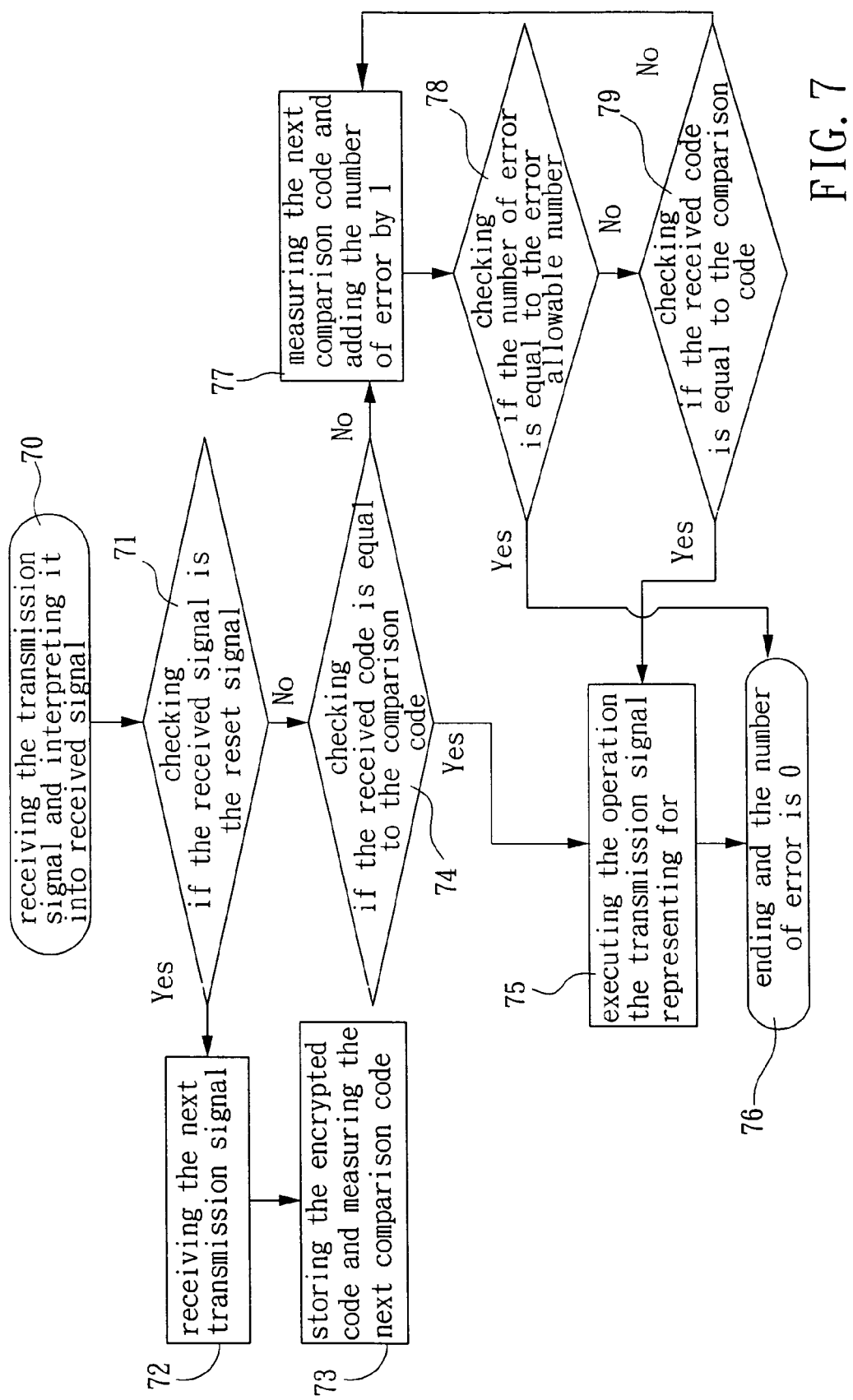
FIG. 7 is a flow chart showing the decoding process in a transmitter according to the present invention.

FIG. 7 is a flow chart showing the decoding process in a receiver end according to the present invention. It comprises the following steps:

Step 70. receiving the transmission signal 18, interpreting it into received signal 68 and executing the step 71;

Step 71. checking if the received signal 68 is the pre-determined value representing the reset signal 154, executing step 72 when yes, executing step 74 when no;

Step 72. receiving the next transmission signal 18 and executing the step 73;

Step 73. storing the encrypted code 150, measuring the next comparison code 60 and executing the step 70;

Step 74. checking if the received code 68 is equal to the comparison code 60, executing the step 75 when yes, executing the step 77 when no;

Step 75. executing the operation the transmission signal 18 representing for and executing the step 76;

Step 76. ending and the number of error are 0;

Step 77. measuring the next comparison code 60, adding the number of error by 1 and executing the step 78;

Step 78. checking if the number of error is equal to the error allowable number 66, executing step 76 when yes, executing step 79 when no; and Step 79. checking if the received code 68 is equal to the comparison code 60, executing the step 75 when yes, executing the step 77 when no.

Although this invention has been disclosed and illustrated with reference to particular embodiments thereof, and in terms of the illustrative drawings, it should not be considered as being limited thereby. Various possible modifications, omission, and alterations could be conceived of by one skilled in the art to form and the content of any particular embodiment, without departing from the scope of the present invention.

What is claimed is:

1. An encoding method for a remote controller, comprising the following steps:
   (a) utilizing a identification signal to generate a plain code and an encrypted code;
   (b) utilizing the encrypted code to control the baud rate for transmitting the plain code; when the encrypted code is in a first base, the plain code corresponding to the encrypted code will be transmitted with a first baud rate; when the encrypted code is in a second base, the plain code corresponding to the encrypted code will be transmitted with a second baud rate.

2. The method of claim 1, wherein the identification signal comprises three sections, the first section is a vender code which represents a vender business identification code, the second section is a user group code which is designated for a group in which users have a same property, the third section is a user code which is used for a single user uniquely.

3. The method of claim 2, wherein the vender code and the user group code are the plain code.

4. The method of claim 1, wherein the step (a) further comprises the following steps:
   (a1) adjusting the length of a user code of the identification signal to obtain a temporary code, and the length of the temporary code is same as the length of the plain code;
   (a2) encoding the temporary code and the encrypted code that is used previously to generate a new encrypted code;
   (a3) outputting the new encrypted code.

5. The method of claim 4, wherein the step (a2) is an Exclusive OR (XOR) operation.

6. The method of claim 4, wherein within the step (a2), the encrypted code being used previously is a pre-determined value when the encoding process is executed for the first time.

7. An encoding device for a remote controller that utilizes baud rate modulation to encrypt a transmission signal, comprising:
   an encoder for receiving an identification signal and encoding a part of said identification signal to be an encrypted code;
   an interpreter connected to the encoder for interpreting the un-encoded portion of the identification signal and the encrypted code generated by the interpreter to a transmission signal;

wherein the interpreter interprets the length of the waveform of the un-encoded portion of the identification signal according to the following rules:
(1) when the encrypted code is in a first base, the plain code corresponding to the encrypted code is transmitted with a first baud rate;
(2) when the encrypted code is in a second base, the plain code corresponding to the encrypted code is transmitted with a second baud rate.

8. The device of claim 7, wherein the identification signal comprises three sections, the first section is a vender code which represents a vender business identification code, the second section is a user group code which is designated for a group in which the users have same property, the third section is a user code which is used for a single user uniquely.

9. The device of claim 8, wherein the vender code and the user group code are the plain code.

10. The device of claim 8, wherein the encoder further comprises;
an encrypted code generator for receiving the identification signal and encrypting the identification signal with a logical circuit algorithm to generate the encrypted code;
a length normalizer for adjusting the identification signal length; and
a controller connected to the encrypted code generator for outputting the encrypted code or a reset signal according to different situation.

11. The device of claim 10, wherein the encrypted code generator generates the encrypted code with the following steps:
(a) adjusting the length of the user code of the identification signal to obtain a temporary code, and the length of the temporary code is same as the length of the plain code;
(b) encoding the temporary code and the encrypted code that is used previously to generate a new encrypted code;
(c) outputting the new encrypted code.

12. The method of claim 11, wherein the step (b) is an Exclusive OR (XOR) operation.

13. The method of claim 11, wherein within the step (b), the encrypted code being used previously is a pre-determined value when the encoding process is executed first time.

* * * * *